(12) United States Patent
Nelson et al.

(10) Patent No.: US 11,206,194 B1
(45) Date of Patent: Dec. 21, 2021

(54) AUTHORIZATION FOR ACCESS TO FUNCTIONS IN A NETWORK SLICE

(71) Applicant: T-MOBILE INNOVATIONS LLC, Overland Park, KS (US)

(72) Inventors: Tracy L. Nelson, Overland Park, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 107 days.

(21) Appl. No.: 16/554,559

(22) Filed: Aug. 28, 2019

(51) Int. Cl.
*H04L 12/24* (2006.01)
*G06F 16/182* (2019.01)
*G06F 9/455* (2018.01)

(52) U.S. Cl.
CPC ...... *H04L 41/5012* (2013.01); *G06F 9/45558* (2013.01); *G06F 16/1824* (2019.01); *H04L 41/0893* (2013.01); *H04L 41/28* (2013.01); *G06F 2009/45595* (2013.01)

(58) Field of Classification Search
CPC . H04L 41/0893; H04L 41/28; H04L 41/5012; G06F 16/1824; G06F 9/45558; G06F 2009/45595
USPC .................................................. 709/217, 223
See application file for complete search history.

(56) References Cited

U.S. PATENT DOCUMENTS

| | | | | |
|---|---|---|---|---|
| 2018/0054765 | A1* | 2/2018 | Kim | H04W 36/06 |
| 2019/0379664 | A1* | 12/2019 | Suthar | H04W 4/70 |
| 2020/0007311 | A1* | 1/2020 | Oberhofer | H04L 9/3297 |
| 2020/0057860 | A1* | 2/2020 | Patil | H04L 63/1433 |
| 2020/0065811 | A1* | 2/2020 | Sloane | G06Q 20/4014 |

OTHER PUBLICATIONS

L. Ferretti, F. Longo, M. Colajanni, G. Merlino and N. Tapas, "Authorization Transparency for Accountable Access to IoT Services," 2019 IEEE International Congress on Internet of Things (ICIOT), Milan, Italy, 2019, pp. 91-99, doi: 10.1109/ICIOT.2019.00027. (Year: 2019).*

* cited by examiner

*Primary Examiner* — Suraj M Joshi
*Assistant Examiner* — Melaku Y Habtemariam

(57) ABSTRACT

A method of authorizing access to a plurality of enterprise services provided by a network slice. The method comprises receiving a first message from an electronic device by an authorization module that executes on a computer system on which a network slice executes and wherein the first message requests access to a first enterprise service that executes in the network slice, based on accessing and examining a first block of a blockchain associated with the network slice by the authorization module, determining by the authorization module that the electronic device is authorized to access the first enterprise service, passing the first message to the first enterprise service for processing.

20 Claims, 9 Drawing Sheets

AUTHORIZATION FOR ACCESS TO FUNCTIONS IN A NETWORK SLICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network slices provide a dedicated communication network for use by an enterprise or organization or individual, where the dedicated communication network is delivered as a virtual resource. From the point of view of the users, the network slice behaves as if it were a separate network infrastructure, but the network slice is delivered by virtualized computing resources provided by a common physical communication and computing infrastructure. Network slicing is expected to optimize the efficiency of communication networks without sacrificing security or flexibility. New functionality and new services are expected to be enabled and deployed using network slices.

SUMMARY

In an embodiment, a method of authorizing access to a plurality of different services provided by a network slice is disclosed. The method comprises authenticating an electronic device by a session border controller (SBC) for access to a network slice and receiving a first message from the electronic device by a first authorization module associated with the network slice, wherein the first authorization module executes on a computer system on which the network slice executes and wherein the first message requests access to a first service provided by the network slice. The method further comprises accessing a first block of a blockchain associated with the network slice by the first authorization module, based on examining the first block, determining by the first authorization module that the electronic device is authorized to access the first service, and passing the first message by the first authorization module to the first service for processing. The method further comprises receiving a second message from the electronic device by a second authorization module, wherein the second authorization module executes on the computer system on which the network slice executes and wherein the second message requests access to a second service provided by the network slice, accessing a second block of a blockchain associated with the network slice by the second authorization module, based on examining the second block, determining by the second authorization module that the electronic device is authorized to access the second service, and passing the second message by the second authorization module to the second service for processing.

In another embodiment, a computer system is disclosed. The computer system comprises a processor, a non-transitory memory, and an application stored in the non-transitory memory. When executed by the processor, the application receives a first message from an electronic device, where the first message requests access to a first service provided by a network slice, accesses a first block of a blockchain associated with the network slice, based on examining the first block, determines that the electronic device is authorized to access the first service, and passes the first message to the first service for processing. The application further receives a second message from the electronic device, where the second message requests access to a second service provided by the network slice, accesses a second block of a blockchain, based on examining the second block, determines that the electronic device is authorized to access the second service, and passes the second message to the second service for processing.

In yet another embodiment, a method of authorizing access to a plurality of enterprise services provided by a network slice is disclosed. The method comprises receiving a first message from an electronic device by a first authorization module associated with a network slice that executes on a computer system, wherein the first authorization module executes on a computer system on which the network slice executes and wherein the first message requests access to a first enterprise service that executes in the network slice and accessing a first block of a blockchain associated with the network slice by the first authorization module. The method further comprises, based on examining the first block, determining by the first authorization module that the electronic device is authorized to access the first enterprise service and passing the first message by the first authorization module to the first enterprise service for processing. The method further comprises receiving a second message from the electronic device by the first authorization module, wherein the second message requests access to a second enterprise service that executes in the network slice, accessing a second block of the blockchain by the first authorization module, based on examining the second block, determining by the first authorization module that the electronic device is authorized to access the second enterprise service, and passing the second message by the first authorization module to the second enterprise service for processing. The method further comprises receiving a third message from the electronic device by a second authorization module associated with the network slice, wherein the second authorization module executes on the same computer system on which the network slice executes and wherein the third message requests access to a virtual service provided by the network slice, wherein the virtual service is different from the first and the second enterprise service, accessing a third block of a second blockchain associated with the network slice by the second authorization module, based on examining the third block, determining by the second authorization module that the electronic device is authorized to access the virtual service, and passing the third message by the second authorization module to the virtual service for processing.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
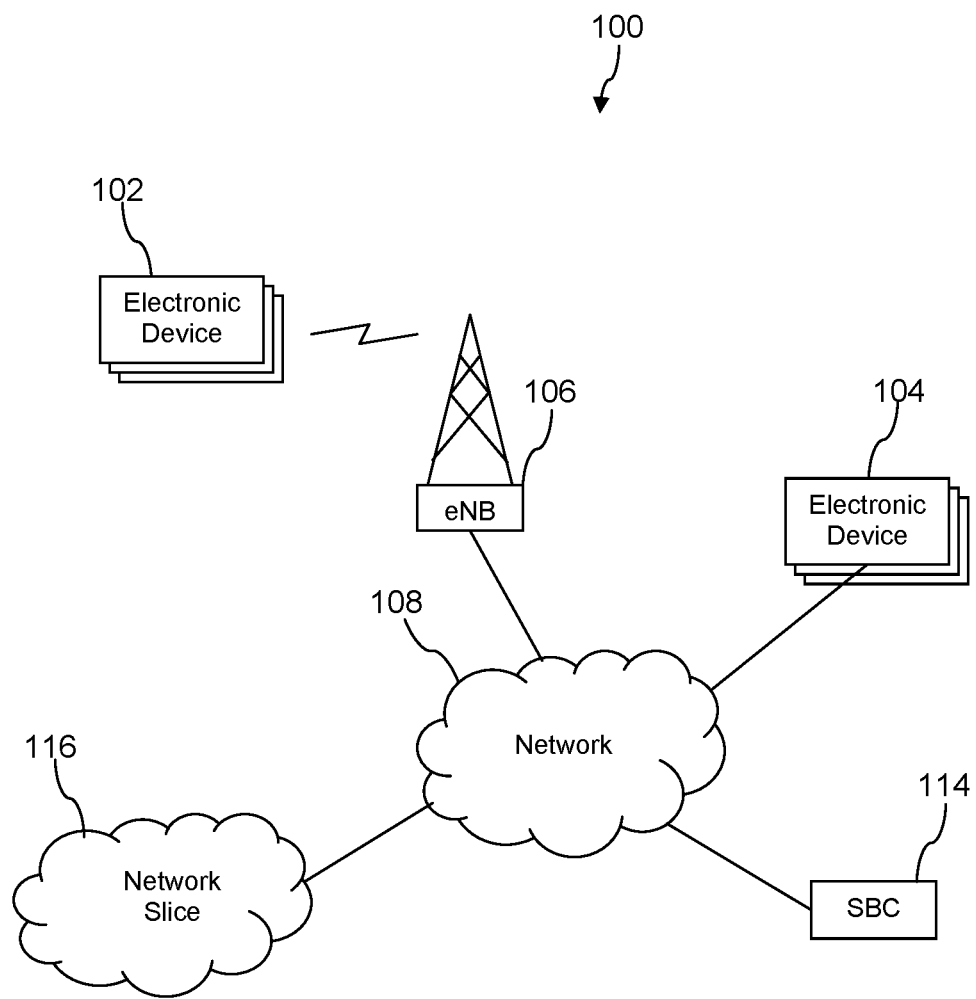
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network slicing is expected to be an important communication network capability in the near future. The present disclosure teaches systems and methods for supporting and promoting network slicing. In an embodiment, initial access to a network slice may be arbitrated by a session border controller (SBC) that challenges a user to present some sort of authentication credentials such as a user identity and password or a user identity and a biometric signature. Once the user is admitted to the network slice, however, the user may wish to avail himself or herself of different functionalities or services provided within the network slice. Access to a function or service may be subject to authorization challenges, and not all users admitted to a network slice may be authorized to access every function or service provided within the network slice. Both the authentication processes and authorization processes may be conducted automatically by a communication device and by applications executing in the network slice, possibly without direct involvement of a user of the communication device.

In an embodiment, a blockchain stored in memory accessible to an orchestrator process of the network slice defines authorizations associated to virtual network functions (VNFs), virtual services, and/or enterprise services provided by the network slice. Each block of the blockchain, excepting the first or genesis block of the blockchain, may be associated with a different one of the VNFs, virtual services, and enterprise services. When a user—or an application executing on behalf of a user on a user communication device—attempts to use one of the VNFs, virtual services, or enterprise services, the orchestrator accesses and reads the block associated with the subject VNF, virtual service, or enterprise service and executes microcode stored in the subject block that defines an authorization process. In an embodiment, the orchestrator may invoke execution of an authorization module within the network slice to authorize the user, and the authorization module may access and read the block associated with the VNF, virtual service, or enterprise service and execute the associated microcode. If the user is authorized, the requested VNF, virtual service, or enterprise service is performed on behalf of the user. In some cases, accessing the VNF, virtual service, and/or enterprise service may entail an ongoing session between the user's communication device and the subject service or function in the network slice involving a plurality of messages back and forth.

In an embodiment, access to VNFs is authorized by a first authorization module, access to virtual services is authorized by a second authorization module, and access to enterprise services is authorized by a third authorization module. The first, second, and third authorization modules may be considered to be part of a distributed application, for example different instances of the same generic authorization module software that are configured at run-time to interwork with a particular category (e.g., either to work with VNFs or to work with virtual services or to work with enterprise services). Alternatively, the authorization modules may be implemented by distinct and different software artifacts.

The first authorization module, the second authorization module, and the third authorization module may all access the same blockchain to access authorization microcodes and to identify authorized users and authorized applications. Alternatively, the first authorization module may access a first blockchain containing blocks defining microcode and access rights associated with VNFs, the second authorization module may access a second blockchain containing blocks defining microcode and access rights associated with virtual services, and the third authorization module may access a third blockchain containing blocks defining microcode and access rights associated with enterprise services. The use of multiple authorization modules and/or multiple blockchains within the network slice may provide desirable isolation between VNFs, virtual functions, and enterprise functions. This isolation may promote increased security in some applications.

In an embodiment, a communication service provider may provide a network slice for the exclusive use of one enterprise or organization. For example, a commercial airline company may pay for a network slice to be provided by a communication service provider and set up communication among its locations via its network slice. The airline company may conduct baggage handling communications and flight schedule management and monitoring via its network slice. Users and applications may be authenticated by an SBC before entering the enterprise's network slice and then once granted entrance to the enterprise's network slice, access of users and/or applications to various VNFs, virtual services, and enterprise services may be authorized by appropriate authorization modules. In an embodiment, each different enterprise service may be associated with its own blockchain that defines microcodes and authorizations for access to its services. Each different enterprise service may be associated with its own authorization module that executes to determine if a user or an application is authorized to access its service. Separating authorization modules and blockchains in this way may promote ease of extending or adding enterprise services without interfering with other previously existing services or functions in the network slice. This may be referred to in some contexts as promoting extensibility.

It is noted that since the blockchains exist within the network slice they are secure from external tampering. The actual founding of blocks of the blockchains occurs inside the network slice and is accessed from within the network slice. In this context, security of the blockchain is inherent and consensus arbitration is unnecessary, thereby saving computer processing that would otherwise be involved in brokering consent among different instances of the blockchain.

The microcode in the blocks of the blockchains can be executed to authorize access to the subject function or service and also to restrict activities undertaken within the function or service. The microcode can further track these activities, compare performance parameters to service level agreements (SLAs), adapt processing within the network slice accordingly, and aggregate logs which may be used for billing purposes. At least some of the microcode may trigger the founding of new blocks added to the blockchain to record these things. This information can be used to bill per network slice. Blocks that store information pertaining to events that occur in the network slice may be referred to as event blocks in some contexts.

While the descriptions herein rely upon using blockchains to store authorization credentials, authorization lists, authorization microcode, event recording microcode, and other microcode, it is understood that in alternative embodiments a storage data structure different from blockchain may be employed to provide functionality similar to that of the blockchain or blockchains in the network slice. One or more different storage data structures may be provided within the network slice, for example using virtual storage resources provided by the same computer system that provides the network slice. One or more different storage data structures may be provided within the network slice, for example using virtual storage resources provided by the same virtual computing resources that provide the network slice, for example virtual computing resources provided by a private cloud computing environment.

Turning now to FIG. 1, a system 100 is described. In an embodiment, the system 100 comprises a plurality of electronic devices 102, a plurality of electronic devices 104, a cell site 106, a network 108, a session border controller (SBC) 114, and a network slice 116. The electronic devices 102 may be a mobile phone, a smart phone, a personal digital assistant (PDA), a wearable computer, a headset computer, a laptop computer, a notebook computer, or a tablet computer. The electronic devices 102 may be a desktop computer, a workstation, a laptop computer, a tablet computer, or a notebook computer. The cell site 106 may provide communication coupling from the electronic devices 102 to the network 108 according to a 5G protocol, for example 5G, 5G New Radio, or 5G LTE radio communication protocols. The cell site 106 may provide communication coupling from the electronic devices 102 to the network 108 according to a long term evolution (LTE), a code division multiple access (CDMA), and/or a global system for mobile communication (GSM) radio communication protocol.

While not shown, some of the electronic devices 102 may be communicatively coupled to the network 108 via a WiFi access point or another non-cellular radio device. While a single cell site 106 is illustrated in FIG. 1, it is understood that the system 100 may comprise any number of cell sites 106. The network 108 comprises one or more public networks, one or more private networks, or a combination thereof. While shown as communicatively coupled to the network 108, the SBC 114 may be considered to be part of the network 108. The SBC 114 is illustrated separate from the network 108 to promote discussing its role in the system 100 and the authentication of electronic devices 102, 104 for communicating with the network slice 116. The network slice 116, likewise, could be construed as part of the network 108 but is illustrated separately in FIG. 1 to promote discussing it more fully.

The network slice 116 is provided by an independent set of software functions and/or instantiations that both provide the behaviors of a communication network and bound the network slice 116 and isolate it logically from the network 108. In an embodiment, the network slice 116 is provided by virtual machines executing on top of physical servers using a private cloud computing execution paradigm. The network slice 116 may provide a private communication channel from one device to another device. Alternatively, the network slice 116 can provide a variety of services that comprise either specialized of premium communication functionalities or are non-communication services.

When an electronic device 102, 104 seeks to communicate via the network slice 116, the SBC 114 authenticates the device. For example, the SBC 114 may issue a challenge to the device 102, 104 to present a user identity and a password. Alternatively, the SBC 114 may receive a user identity and a biometric electronic signature. The user identity, password, and/or biometric electronic signature may be referred to as authentication credentials and may include other kinds of credentials. The SBC 114 may check a data store associated with the network slice 116 that identifies users and/or applications that are to be granted access to the network slice 116. For example, a data structure such as a blockchain stored in the network slice 116 may identify sets of authentication credentials that are associated with users and/or applications that are to be granted access to the network slice 116. Once the device 102, 104 has been granted access to the network slice 116, it may seek to invoke other services of the network slice 116 or simply to obtain communication connectivity via the network slice 116 to another device 102, 104.

It is understood that when the disclosure speaks of the device 102, 104 establishing a communication session or channel, authenticating, and invoking services that this may refer to an application that is executing on the device 102, 104 that automatically performs these actions, possibly without the user of the device 102, 104 being explicitly involved. For example, a user of a device 102, 104 may launch an application, and the application thereafter may authenticate with the SBC 114 to gain access to the network slice 116 and the application may invoke a service provided by the network slice 116.

Figure 2:
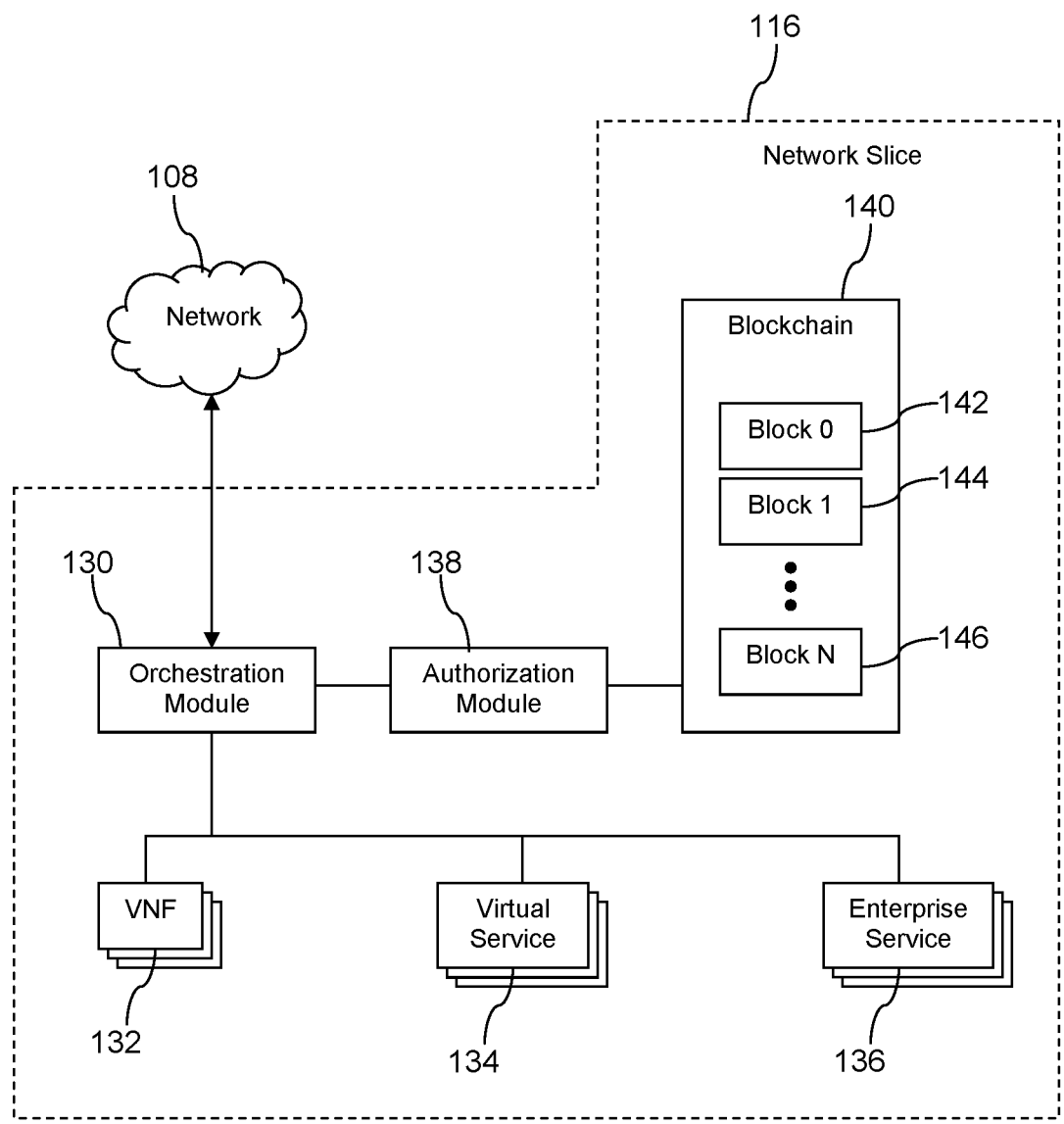
FIG. 2 is a block diagram of a network slice according to an embodiment of the disclosure.

Turning now to FIG. 2, further details of the network slice 116 are described. In an embodiment, the network slice 116 comprises an orchestration module 130, one or more virtual network functions (VNFs) 132, one or more virtual services 134, an authorization module 138, and a blockchain 140. In some embodiments of the network slice 116—for example a network slice 116 instantiated by a communication service provider for use by an enterprise or other organization—further comprises one or more enterprise services 136. The VNFs 132 may comprise network communication functionality that is delivered in the form of virtual network functions that are provided by software executing on computer systems, for example executing in virtual machines executing on top of one or more physical computers. The virtual services 134 may comprise services delivered by software executing in virtual machines executing on top of one or more physical computers. The VNFs 132 and the virtual services 134 may be provided by software developed by a communication service provider, for example developed by a wireless communication service provider.

The enterprise services 136 may comprise services delivered by software executing in virtual machines executing on top of one or more physical computers. The enterprise services 136 may be provided by software developed by an enterprise or a third party that are different from a communication service provider. The virtual slice 116—including the orchestration module 130, the authorization module 138, and the blockchain 140—may be provided by software executing on computer systems, for example executing in virtual machines executing on top of one or more physical computers and using non-transitory memory provided by virtual storage entities. The enterprise services 136 may comprise one or more airline services, one or more healthcare services, or one or more financial services.

The blockchain 140 comprises a plurality of blocks: a first block 142, a second block 144, and a third block 146. It is understood that the blockchain 140 may comprise any number of blocks and that additional blocks may be added to the blockchain 140 over time. The first block 142 may be referred to as a genesis block or a block zero. The first block 142 can be considered to be the origin of the blockchain 140. The first block 142 may comprise information and/or microcode related to the network slice 116 and or maintenance of the blockchain 140. Each subsequent block in the blockchain 140 may comprise a data content, a nonce or random number selected to satisfy a predefined condition, a hash value of the preceding block (this feature may be missing in the first block 142 because it has no preceding block in the blockchain 140), and a hash value calculated over (a) the data content of the block, (b) the nonce, and (c) the previous hash value. The nonce may be selected such that the hash value calculated over the block has a predefined number of leading zeros—for example four leading zeros—or some other predefined format. The data content may comprise data, parameter values, authentication credentials, and authorization credentials. The data content may further comprise microcode that may be executed by the orchestration module 130 or the authorization module 138. In an embodiment, the authorization module 138 and/or the orchestration module 130 are allowed to access the blockchain 140.

When, for example, the electronic device 102 requests to communicate with the electronic device 104 via the network slice 116, the electronic device 102 is first authenticated by the SBC 114 and then the request is passed to the orchestration module 130 in the network slice 116. The orchestration module 130 may allow the electronic device 102 to establish a communication channel via the network slice 116 to the electronic device 104 with no further authorization challenge, for example when conducting conventional communication. The conventional communication may entail executing some of the VNFs 132.

If the electronic device 102 requests other communication service, for example a premium communication service, the orchestration module 130 may determine that the request ought to be authorized by the authorization module 138 and hands-off the request to the authorization module 138. The authorization module 138 may determine whether or not the electronic device 102 is authorized to receive the communication service specified in its request by referencing the blockchain 140. This may entail the authorization module 138 accessing one or more blocks of the blockchain 140 to obtain microcode to execute to authorize the electronic device 102 and/or to obtain data that identifies VNFs 132, virtual services 134, and/or enterprise services the electronic device 102 is authorized to access.

The authorization module 138 may execute microcode stored in the blockchain 140 that performs the authorization check. The subject microcode may be stored in a block in the blockchain 140 that is associated to one of the VNFs 132, one of the virtual services 134, or one of the enterprise services 136. Thus, if the electronic device 102 requests to receive a second virtual service 134, the authorization module 138 may access and read a block in the blockchain 140 that is associated to the second virtual service 134. If the electronic device 102 requests to receive a third virtual service 134, the authorization module 138 may access and read a different block in the blockchain 140 that is associated to the third virtual service 134. The authorization module 138 may execute the microcode it has accessed from the block in the blockchain 140 associated to the VNF 132, the virtual service 134, or the enterprise service 136 requested by the electronic device 102 and may provide the identity of the electronic device 102 as an input parameter. The executed microcode may access a different block in the blockchain 140 that is associated with the identity of the electronic device 102, for example a block that contains a list of VNFs 132, virtual services 134, and/or enterprise services 136 that identified electronic device 102 is authorized to request.

If the authentication module 138 determines the electronic device 102 is authorized to receive the requested VNF 132, virtual service 134, or enterprise service 136, the authentication module 138 informs the orchestration module 130 that the request has been authorized. The orchestration module 138 may then forward the request on to the subject VNF 132, virtual service 134, or enterprise service 136. If the authentication module 138 determines the electronic device 102 is not authorized, it informs the orchestration module 130 that the electronic device 102 is not authorized to receive the requested function or service, and the orchestration module 130 returns a request rejection message back to the electronic device 102. In this example, since the electronic device 104 is part of the communication channel, authorization may also be performed on the electronic device 104 as described above with reference to the electronic device 102. In another example, however, where only a single electronic device 102, 104 is engaged in the request, only that electronic device would be subjected to an authorization check process by the authorization module 138.

The microcode that is stored in the blocks of the blockchain 140 may further be executed to track events in the network slice 116 and to store those events, for example in a data store (not shown) or in newly created blocks that are added to the blockchain 140. The microcode associated not with authorization processing but tracking of events may be provided by the orchestration module 130 to the subject VNF 132, virtual service 134, or enterprise service 136 when the orchestration module 130 forwards the request from the electronic device 102. The VNF 132, the virtual service 134, or the enterprise service 136 may then execute the microcode. The microcode may provide some restrictions or limitations on the processing provided for the electronic device 102 by the VNF 132, the virtual service 134, or the enterprise service 136. For example, the microcode may define some quality of service (QoS) or service level agreement (SLA) that applies to the electronic device 102, and the VNF 132, the virtual service 134, or the enterprise service 136 may provide functions or services to the electronic device 102 based on the QoS or SLA defined by the microcode. For example, by executing the microcode, the VNF 132, the virtual service 134, or the enterprise service 136 may configure itself so as to achieve the given QoS or SLA.

In an embodiment, execution of some of the microcode may create new blocks that are added to the blockchain 140 to record events in the network slice 116. For example, when an electronic device 102, 104 is authorized to access one of the VNFs 132, the virtual services 134, or one of the enterprise services 136, this event may be recorded by the creation of a block, adding information about the event into a data content portion of the block, and adding the block to the blockchain 140. The information stored in the data content portion of the block may comprise a timestamp, an identity of the electronic device 102, 104, or a type of event. The orchestration module 130 or a billing module (not shown) may execute and analyze the event blocks stored in the blockchain 140 periodically to determine a bill for use of the network slice 116, for example monthly.

Figure 3:
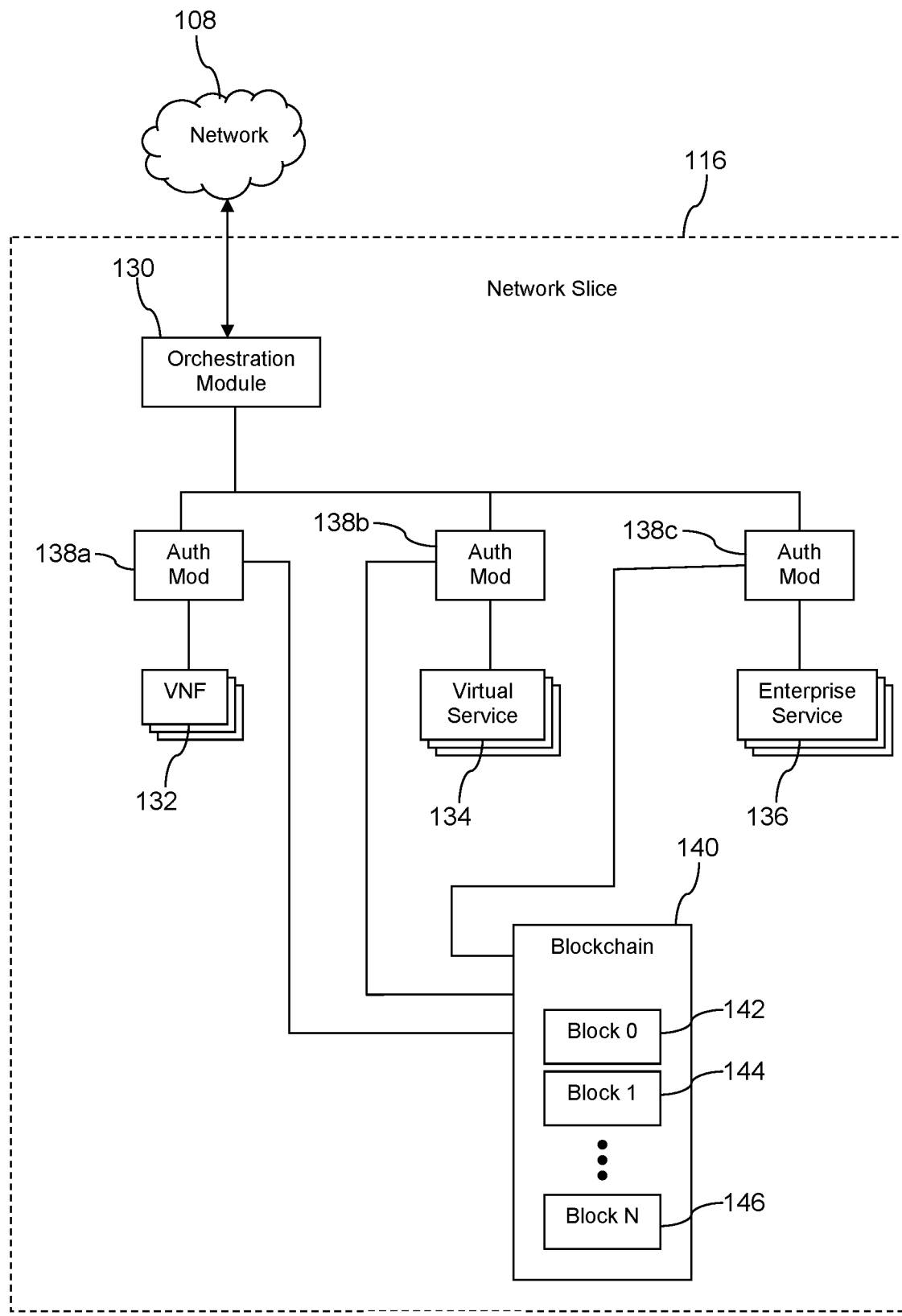
FIG. 3 is a block diagram of another network slice according to an embodiment of the disclosure.

Turning now to FIG. 3, an alternative configuration of the network slice 116 is described. In the embodiment of the network slice 116 depicted in FIG. 3, a first authorization module 138a performs authorization for accesses to the VNFs 132, a second authorization module 138b performs authorization for accesses to the virtual services 134, and a third authorization module 138c performs authorization for access to the enterprise services 136. At an abstract level, the behavior of the network slice in FIG. 3 is very similar to the behavior of the network slice depicted in FIG. 2. In the embodiment of the network slice depicted in FIG. 3, however, the flow of requests from the electronic device 102, 104 is different. In the embodiment of the network slice 116 depicted in FIG. 3, the request is passed to the authorization module 138 associated with the subject function or service, and that authorization module 138 authorizes (or rejects) the requested access to its associated function or service.

In some cases, this alternative architecture may provide additional security and isolation between VNFs 132, virtual services 134, and enterprise services 136 within the same network slice 116. For example, in the embodiment of the network slice 116 depicted in FIG. 3, the first authorization module 138a need not access blocks of the blockchain 140 associated with the virtual services 134 or the enterprise services 136 and, in fact, may be configured to be incapable of accessing those blocks associated with the virtual services 134 or the enterprise services 136. In another embodiment, the first authorization module 138a and the VNFs 132 are associated with a first blockchain, the second authorization module 138b and the virtual services 134 are associated with a second blockchain, and the third authorization module 138c and the enterprise services 136 are associated with a third blockchain. The first authorization module 138a and the VNFs 132 execute microcode stored in the first blockchain and add event blocks to the first blockchain. The second authorization module 138b and the virtual services 134 execute microcode stored in the second blockchain and add event blocks to the second blockchain. The third authorization module 138c and the enterprise services 136 execute microcode stored in the third blockchain and add event blocks to the third blockchain. In some applications this additional isolation may be desirable, for example to comply with personal card information (PCI) privacy regulations or HIPPA privacy regulations.

Figure 4:
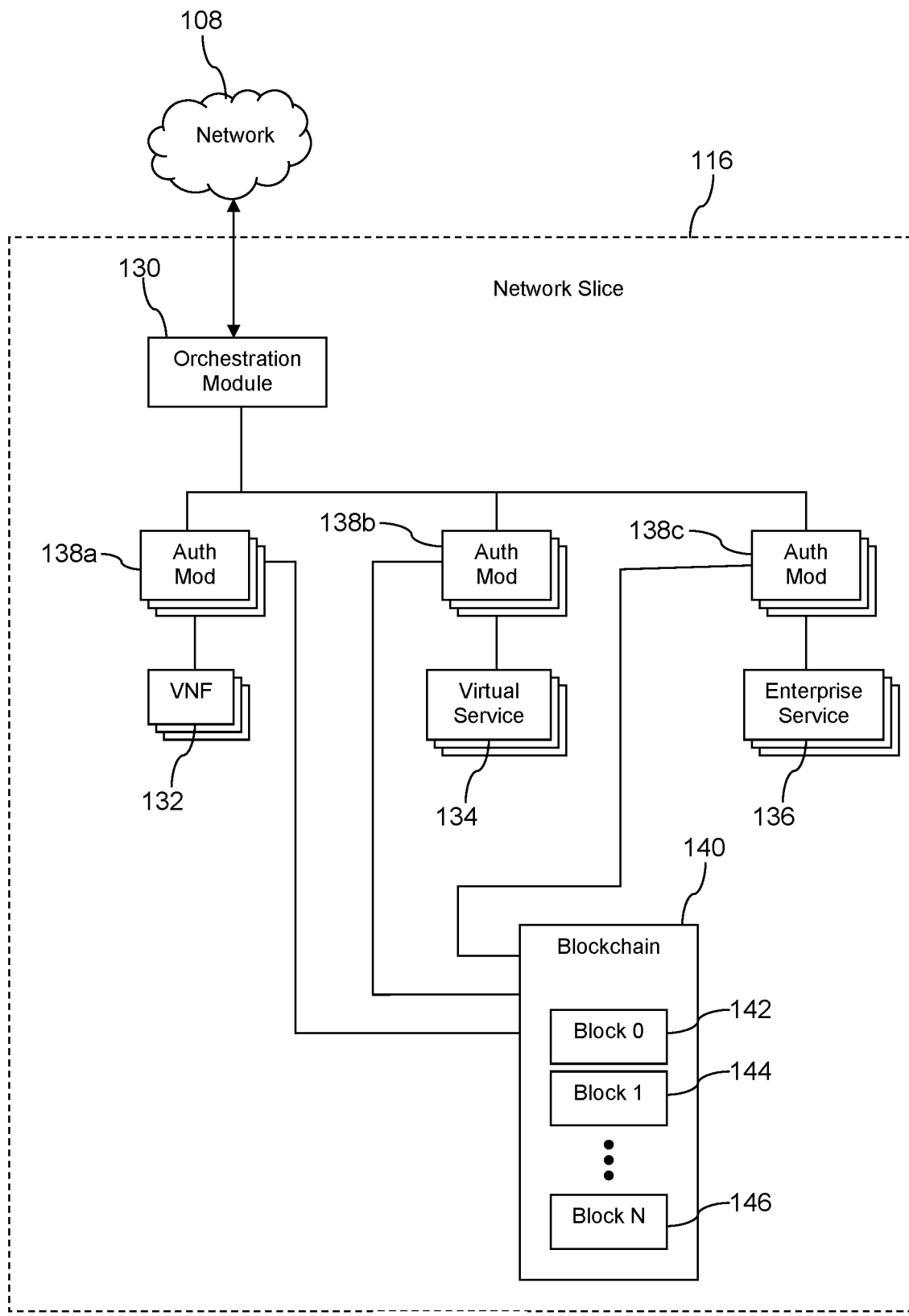
FIG. 4 is a block diagram of yet another network slice according to an embodiment of the disclosure.

Turning now to FIG. 4, yet another alternative configuration of the network slice 116 is described. In the embodiment, of the network slice 116 depicted in FIG. 4, a plurality of first authorization modules 138a are associated with VNFs 132, a plurality of second authorization modules 138b are associated with virtual services 134, and a plurality of third authorization modules 138c are associated with enterprise services 138c. The number of first authentication modules 138a may be the same as or less than the number of VNFs 132 (e.g., at least one of the first authentication modules 138a may perform authorization services for two or more VNFs 132). The number of second authentication modules 138b may be the same as or less than the number of virtual services 134 (e.g., at least one of the second authentication modules 138b may perform authorization services for two or more virtual services 134). The number of third authentication modules 138c may be the same as or less than the number of enterprise services 136 (e.g., at least one of the third authentication modules 138c may perform authorization services for two or more enterprise services 136).

In the embodiment of the network slice 116 depicted in FIG. 4, the architecture supporting a plurality of authorization modules 138 may more readily promote extension of the network slice 116. For example, a new enterprise service 136 may be added and a new authorization module 138c added to interwork with and authorize accesses to the new enterprise service 136, thereby avoiding having to alter legacy authorization modules 138c. The architecture of the network slice 116 depicted in FIG. 4 may also provide security benefits not provided by the network slice 116 depicted in FIG. 3 or by the network slice 116 depicted in FIG. 2.

Figure 5A:
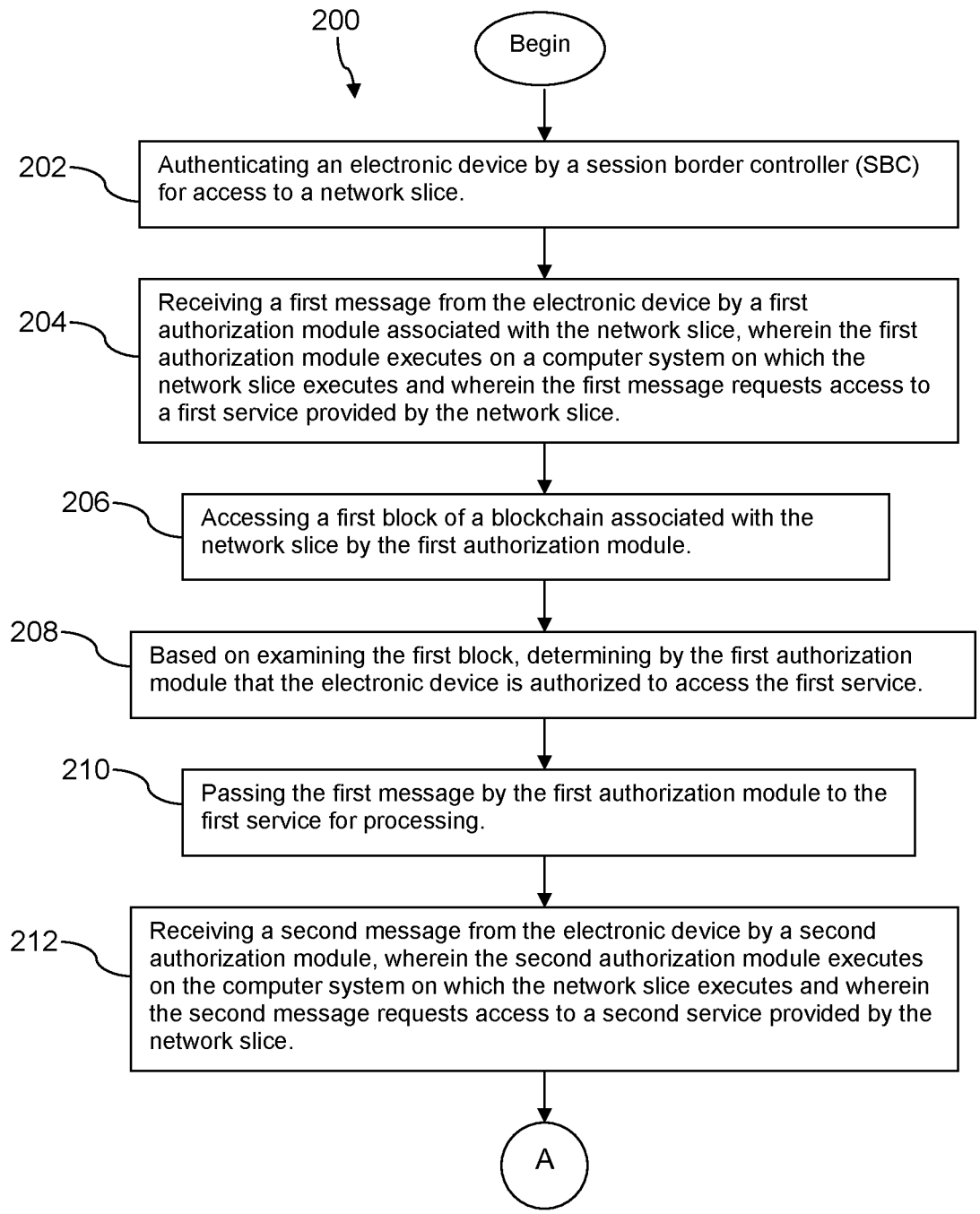
FIG. 5A and FIG. 5B are a flow chart of a method according to an embodiment of the disclosure.
Figure 5B:
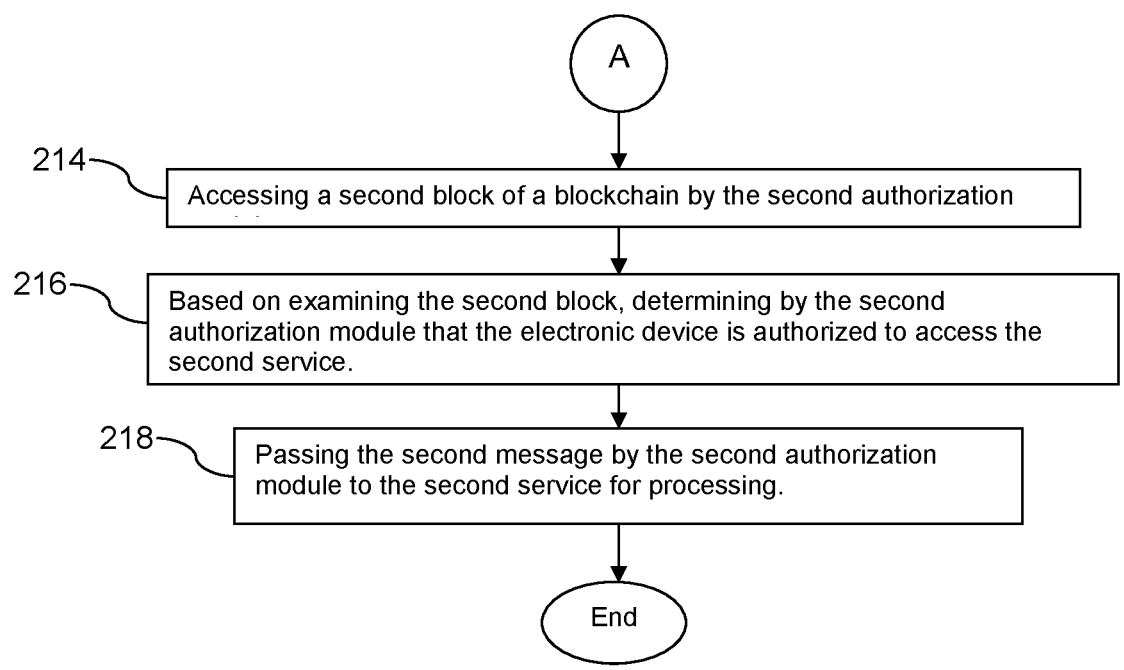

Turning now to FIG. 5A and FIG. 5B, a method 200 is described. In an embodiment, the method 200 is a method of authorizing access to a plurality of different services provided by a network slice. At block 202, the method 200 comprises authenticating an electronic device by a session border controller (SBC) for access to a network slice. At block 204, the method 200 comprises receiving a first message from the electronic device by a first authorization module associated with the network slice, wherein the first authorization module executes on a computer system on which the network slice executes and wherein the first message requests access to a first service provided by the network slice.

At block 206, the method 200 comprises accessing a first block of a blockchain associated with the network slice by the first authorization module. At block 208, the method 200 comprises, based on examining the first block, determining by the first authorization module that the electronic device is authorized to access the first service.

At block 210, the method 200 comprises passing the first message by the first authorization module to the first service for processing. The method 200 may further comprise the first service executing and processing the first message. This processing of the first message may comprise the first service performing some communication service, an enterprise service, or other service on behalf of the electronic device. The processing may further comprise accessing microcode stored in the blockchain, for example stored in the first block or in another block of the blockchain associated with the first service, and executing the microcode. Executing the microcode may comprise detecting events associated with the first service, creating event blocks comprising information about the detected events, and adding event blocks to the blockchain. Executing the microcode may comprise reading event blocks from the blockchain and generating a billing summary associated with the first service.

Executing the microcode may comprise determining a SLA or a QoS associated with the electronic device and/or the first service and providing the first service to the electronic device in accordance with the SLA or the QoS. This processing may comprise looking up an SLA or QoS for the first service in a block of the blockchain based on the identity of the electronic device. For example, a first electronic device seeking to receive the first service may have a first SLA or a first QoS stored in a block of the blockchain that associates to its identity, while a second electronic device seeking to receive the first service may have a second SLA or a second QoS—different from the first SLA or first QoS—that associates to its identity.

At block 212, the method 200 comprises receiving a second message from the electronic device by a second authorization module, wherein the second authorization module executes on the same computer system on which the network slice executes and wherein the second message requests access to a second service provided by the network slice.

At block 214, the method 200 comprises accessing a second block of a blockchain by the second authorization module. In an embodiment, the blockchain accessed by the second authorization module is the same as the blockchain that is accessed by the first authorization module. Said in other words, in an embodiment, the first block and the second block are stored on the same blockchain. In another embodiment, the blockchain accessed by the second authorization module is different from the blockchain that is accessed by the first authorization module. Said in other words, in an embodiment, the first block and the second block are stored on different blockchains. At block 216, the method 200 comprises, based on examining the second block, determining by the second authorization module that the electronic device is authorized to access the second service. At block 218, the method 200 comprises passing the second message by the second authorization module to the second service for processing.

The method 200 may further comprise the second service executing and processing the second message. This processing of the second message may comprise the second service performing some communication service, an enterprise service, or other service on behalf of the electronic device. The processing may further comprise accessing microcode stored in the blockchain, for example stored in the second block or in another block of the blockchain associated with the second service, and executing the microcode. Executing the microcode may comprise detecting events associated with the second service, creating event blocks comprising information about the detected events, and adding event blocks to the blockchain. Executing the microcode may comprise reading event blocks from the blockchain and generating a billing summary associated with the second service.

Figure 6A:
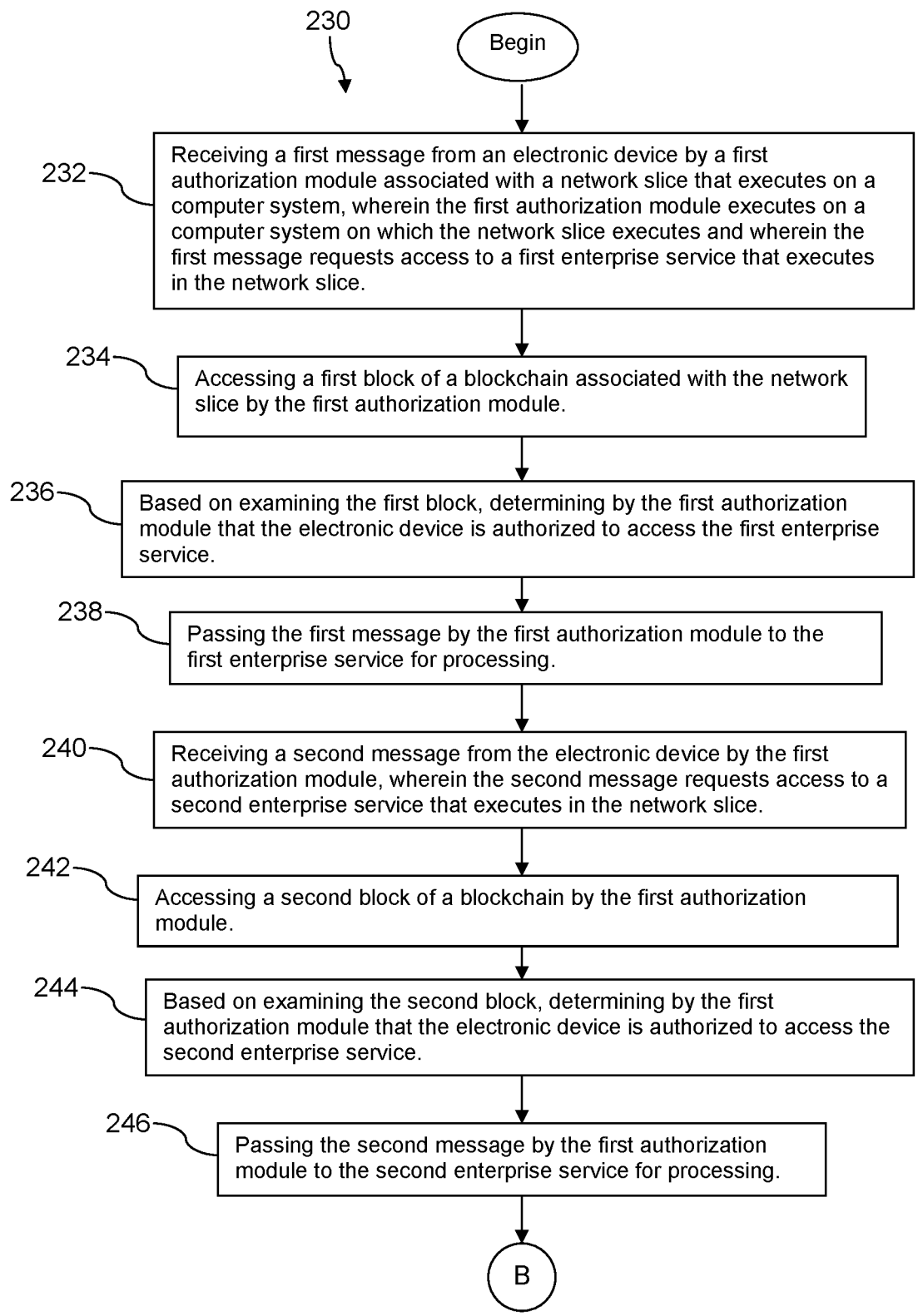
FIG. 6A and FIG. 6B are a flow chart of another method according to an embodiment of the disclosure.
Figure 6B:
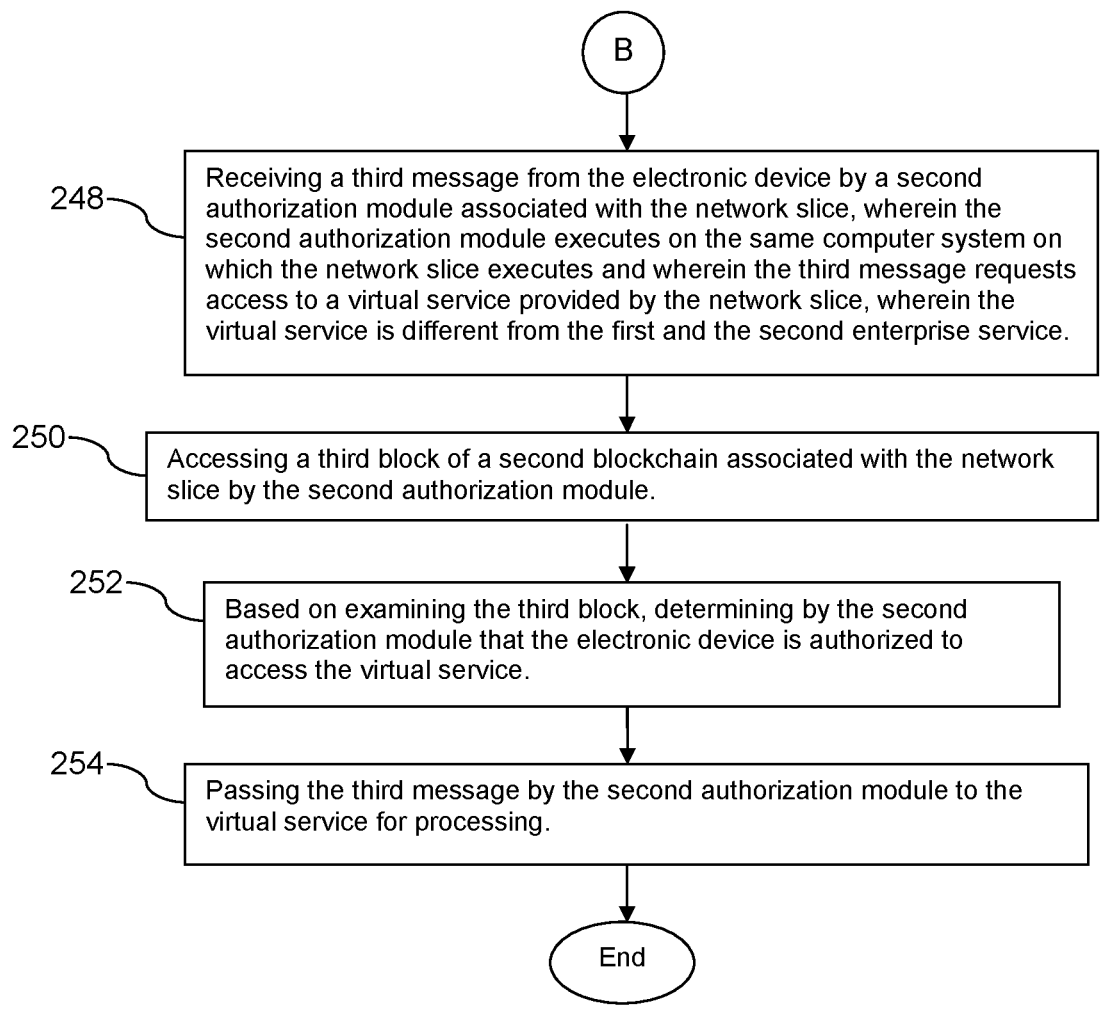

Turning now to FIG. 6A and FIG. 6B, a method 230 is described. In an embodiment, the method 230 is a method of authorizing access to a plurality of services provided by a network slice using multiple authorization modules to promote increased security and extensibility. At block 232, the method 230 comprises receiving a first message from an electronic device by a first authorization module associated with a network slice that executes on a computer system, wherein the first authorization module executes on a computer system on which the network slice executes and wherein the first message requests access to a first enterprise service that executes in the network slice. At block 234, the method 230 comprises accessing a first block of a blockchain associated with the network slice by the first authorization module.

At block 236, the method 230 comprises, based on examining the first block, determining by the first authorization module that the electronic device is authorized to access the first enterprise service. At block 238, the method 230 comprises passing the first message by the first authorization module to the first enterprise service for processing.

At block 240, the method 230 comprises receiving a second message from the electronic device by the first authorization module, wherein the second message requests access to a second enterprise service that executes in the network slice. At block 242, the method 230 comprises accessing a second block of a blockchain by the first authorization module.

At block 244, the method 230 comprises, based on examining the second block, determining by the first authorization module that the electronic device is authorized to access the second enterprise service. At block 246, the method 230 comprises passing the second message by the first authorization module to the second enterprise service for processing.

At block 248, the method 230 comprises receiving a third message from the electronic device by a second authorization module associated with the network slice, wherein the second authorization module executes on the same computer system on which the network slice executes and wherein the third message requests access to a virtual service provided by the network slice, wherein the virtual service is different from the first and the second enterprise service. At block 250, the method 230 comprises accessing a third block of a second blockchain associated with the network slice by the second authorization module.

At block 252, the method 230 comprises based on examining the third block, determining by the second authorization module that the electronic device is authorized to access the virtual service. At block 254, the method 230 comprises passing the third message by the second authorization module to the virtual service for processing.

Figure 7:
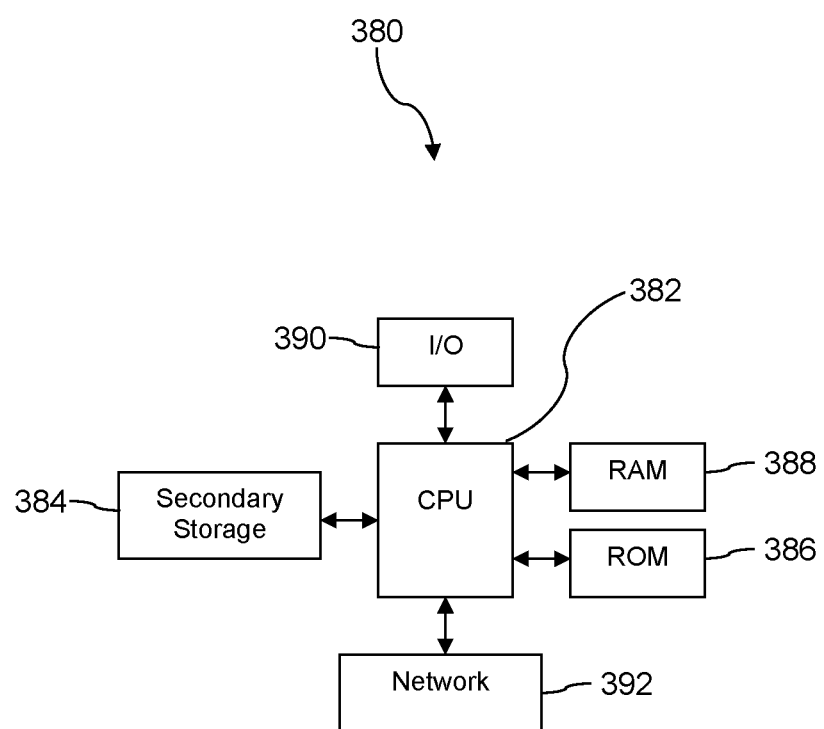
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authorizing access to a plurality of services provided by a network slice using multiple authorization modules to promote increased security and extensibility, comprising: receiving a first message from an electronic device by a first authorization module associated with a network slice that executes on a computer system, wherein the first authorization module executes on a computer system on which the network slice executes and wherein the first message requests access to a first enterprise service that executes in the network slice; accessing a first block of a blockchain associated with the network slice by the first authorization module, wherein the first block is associated with the first enterprise service and comprises a first authorization microcode defining an authorization process for the first enterprise service; based on examining the first block and executing the first authorization microcode stored in the first block, determining by the first authorization module that the electronic device is authorized to access the first enterprise service; passing the first message by the first authorization module to the first enterprise service for processing; receiving a second message from the electronic device by the first authorization module, wherein the second message requests access to a second enterprise service that executes in the network slice; accessing a second block of the blockchain by the first authorization module, wherein the second block is associated with the second enterprise service and comprises a second authorization microcode defining an authorization process for the second enterprise service; based on examining the second block and executing the second authorization microcode stored in the second block, determining by the first authorization module that the electronic device is authorized to access the second enterprise service; passing the second message by the first authorization module to the second enterprise service for processing; receiving a third message from the electronic device by a second authorization module associated with the network slice, wherein the second authorization module executes on the same computer system on which the network slice executes and wherein the third message requests access to a virtual service provided by the network slice, wherein the virtual service is different from the first and the second enterprise service; accessing a third block of a second blockchain associated with the network slice by the second authorization module, wherein the third block is associated with the virtual service and comprises a third authorization microcode defining an authorization process for the virtual service; based on examining the third block and executing the third authorization microcode stored in the third block, determining by the second authorization module that the electronic device is authorized to access the virtual service; and passing the third message by the second authorization module to the virtual service for processing.

2. The method of claim 1, wherein the virtual service is provided by software developed by a wireless communication service provider and the first enterprise service is provided by software developed by an enterprise, where in the enterprise is different from the wireless communication service provider.

3. The method of claim 1, wherein the first enterprise service is one of an airline service, a healthcare service, or a financial service.

4. The method of claim 1, wherein the electronic device is one of a mobile phone, a smart phone, a personal digital assistant (PDA), a wearable computer, a headset computer, a workstation, a desktop computer, a laptop computer, a notebook computer, or a tablet computer.

5. The method of claim 4, wherein the electronic device communicates wirelessly based on one of a 5G, an long term evolution (LTE), a code division multiple access (CDMA), or a global system for mobile communication (GSM) radio communication protocol.

6. The method of claim 1, further comprising executing microcode stored in the first block.

7. A method of authorizing access to a plurality of different services provided by a network slice, comprising: authenticating an electronic device by a session border controller (SBC) for access to a network slice; receiving a first message from the electronic device by a first authorization module associated with the network slice, wherein the first authorization module executes on a computer system on which the network slice executes and wherein the first message requests access to a first service provided by the network slice; accessing a first block of a blockchain associated with the network slice by the first authorization module, wherein the first block is associated with the first service and comprises a first authorization microcode defining an authorization process for the first service; based on examining the first block and executing the first authorization microcode stored in the first block, determining by the first authorization module that the electronic device is authorized to access the first service; passing the first message by the first authorization module to the first service for processing; receiving a second message from the electronic device by a second authorization module, wherein the second authorization module executes on the computer system on which the network slice executes and wherein the second message requests access to a second service provided by the network slice; accessing a second block of a blockchain associated with the network slice by the second authorization module, wherein the second block is associated with the second service and comprises a second authorization microcode defining an authorization process for the second service; based on examining the second block and executing the second authorization microcode stored in the second block, determining by the second authorization module that the electronic device is authorized to access the second service; and passing the second message by the second authorization module to the second service for processing.

8. The method of claim 7, wherein the blockchain accessed by the second authorization module is the same as the blockchain that is accessed by the first authorization module.

9. The method of claim 7, wherein the blockchain accessed by the second authorization module is different from the blockchain that is accessed by the first authorization module.

10. The method of claim 7, further comprising executing microcode stored in a block of the blockchain, where the microcode is associated with the first service.

11. The method of claim 10, wherein executing the microcode comprises detecting events associated with the first service, creating an event block comprising information about the detected events, and adding the event block to the blockchain.

12. The method of claim 11, wherein executing the microcode comprises reading event blocks of the blockchain, and generating a billing summary associated with the first service.

13. The method of claim 10, wherein executing the microcode comprises determining a service level agreement (SLA) associated with the electronic device and with the first service and further comprising providing the first service to the electronic device in accordance with the SLA.

14. A computer system, comprising: a processor; a non-transitory memory; and an application stored in the non-transitory memory that, when executed by the processor: receives a first message from an electronic device, where the first message requests access to a first service provided by a network slice, accesses a first block of a blockchain associated with the network slice, wherein the first block is associated with the first service and comprises a first authorization microcode defining an authorization process for the first service; based on examining the first block and executing the first authorization microcode stored in the first block, determines that the electronic device is authorized to access the first service, passes the first message to the first service for processing, receives a second message from the electronic device, where the second message requests access to a second service provided by the network slice, accesses a second block of a blockchain, wherein the second block is associated with the second service and comprises a second authorization microcode defining an authorization process for the second service; based on examining the second block and executing the second authorization microcode stored in the second block, determines that the electronic device is authorized to access the second service, and passes the second message to the second service for processing.

15. The system of claim 14, wherein the application is a distributed application comprising a first authorization module and a second authorization module, the first authorization module determines that the electronic device is authorized to access the first service and passes the first message to the first service for processing, and the second authorization module determines that the electronic device is authorized to access the second service and passes the second message to the second service for processing.

16. The system of claim 15, wherein the blockchain accessed by the second authorization module is different from the blockchain that is accessed by the first authorization module.

17. The system of claim 16, wherein the blockchain accessed by the first authorization module and the blockchain accessed by the second authorization module are stored in the non-transitory memory and wherein the processor and the non-transitory memory are provided by computing resources provided by the network slice.

18. The system of claim 14, wherein the processor and the non-transitory memory are provided by virtual computing resources that provide the network slice.

19. The system of claim 15, wherein the blockchain accessed by the second authorization module is the same as the blockchain that is accessed by the first authorization module.

20. The system of claim 19, wherein the blockchain is stored in the non-transitory memory and wherein the processor and the non-transitory memory are provided by computing resources provided by the network slice.

* * * * *